US010909346B2

(12) United States Patent
Masuike et al.

(10) Patent No.: US 10,909,346 B2
(45) Date of Patent: Feb. 2, 2021

(54) ELECTRONIC APPARATUS AND CONTROL METHOD

(71) Applicant: KYOCERA CORPORATION, Kyoto (JP)

(72) Inventors: Isao Masuike, Machida (JP); Yasuhiro Ueno, Yokohama (JP); Shigeki Tanabe, Yokohama (JP); Hideki Morita, Yokohama (JP); Koutaro Yamauchi, Yokohama (JP); Manabu Sakuma, Yokohama (JP); Kenji Shimada, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/219,790

(22) Filed: Dec. 13, 2018

(65) Prior Publication Data

US 2019/0188439 A1  Jun. 20, 2019

(30) Foreign Application Priority Data

Dec. 20, 2017  (JP) ................................ 2017-243748

(51) Int. Cl.
  *G06F 3/041*  (2006.01)
  *G06K 9/00*  (2006.01)
  *G06F 21/32*  (2013.01)
  *G06F 3/0488*  (2013.01)
  *G06F 3/0484*  (2013.01)
  *G06F 3/0481*  (2013.01)

(52) U.S. Cl.
  CPC ......... *G06K 9/0002* (2013.01); *G06F 3/0416* (2013.01); *G06F 3/0488* (2013.01); *G06F 3/04817* (2013.01); *G06F 3/04842* (2013.01); *G06F 3/04883* (2013.01); *G06F 3/04886* (2013.01); *G06F 21/32* (2013.01)

(58) Field of Classification Search
  CPC ............... G06F 3/0416; G06F 3/04817; G06F 3/04842; G06F 3/0488; G06F 3/04883; G06F 3/04886; G06F 21/32; G06K 9/00013; G06K 9/0002
  USPC ......................................... 345/173
  See application file for complete search history.

(56) References Cited

U.S. PATENT DOCUMENTS

| 2011/0025626 A1* | 2/2011 | Inami .................. G06F 3/04883 345/173 |
| 2017/0061109 A1* | 3/2017 | Takenouchi ....... G06K 9/00013 |
| 2018/0144111 A1* | 5/2018 | Katingari .............. G06F 3/0416 |

FOREIGN PATENT DOCUMENTS

| JP | 2017-504853 A | 2/2017 |
| WO | 2015/066330 A1 | 5/2015 |

* cited by examiner

*Primary Examiner* — Abdul-Samad A Adediran
(74) *Attorney, Agent, or Firm* — Duane Morris LLP

(57) ABSTRACT

An electronic apparatus comprises a display, a fingerprint sensor, a touch sensor, and at least one processor. The display displays an icon. The fingerprint sensor reads fingerprint information. The touch sensor detects a movement of a finger. The at least one processor executes, when the movement of the finger from the icon toward the fingerprint sensor is detected and fingerprint information is read by the fingerprint sensor, a function of the icon since the fingerprint information which has been read matches registered fingerprint information which has been previously registered.

7 Claims, 15 Drawing Sheets

F I G. 8
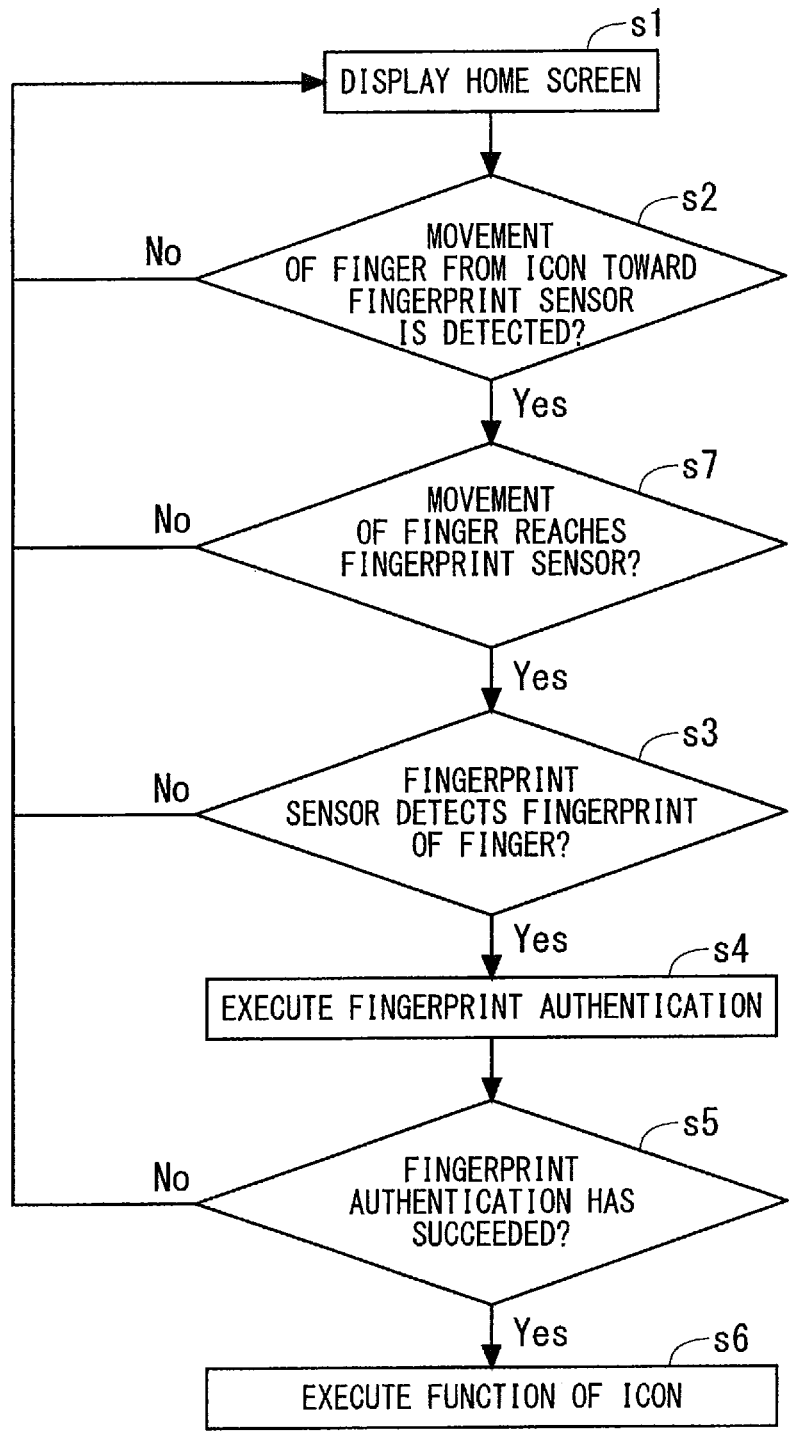

ELECTRONIC APPARATUS AND CONTROL METHOD

CROSS-REFERENCE TO RELATED APPLICATION

The present application claims priority under 35 U.S.C. § 119 to Japanese Patent Application No. 2017-243748, filed on Dec. 20, 2017, entitled "ELECTRONIC APPARATUS AND CONTROL METHOD". The content of which is incorporated by reference herein in its entirety.

FIELD

Embodiments of the present disclosure relate to an electronic apparatus.

BACKGROUND

Various techniques relating to electronic apparatuses are proposed.

SUMMARY

An electronic apparatus and a control method are disclosed. In one embodiment, an electronic apparatus comprises a display, a fingerprint sensor, a touch sensor, and at least one processor. The display displays an icon. The fingerprint sensor reads fingerprint information. The touch sensor detects a movement of a finger. The at least one processor executes, when the movement of the finger from the icon toward the fingerprint sensor is detected and fingerprint information is read by the fingerprint sensor, a function of the icon since the fingerprint information which has been read matches registered fingerprint information which has been previously registered.

In one embodiment, a control method of an electronic apparatus comprises detecting the movement of the finger from the icon toward the fingerprint sensor, and executing, if fingerprint information is read by the fingerprint sensor, a function of the icon since the fingerprint information which has been read matches registered fingerprint information which has been previously registered.

BRIEF DESCRIPTION OF THE DRAWINGS

FIG. 8 illustrates a flow chart showing one example of an operation of the electronic apparatus.

DESCRIPTION OF THE PREFERRED EMBODIMENTS

Figure 1:
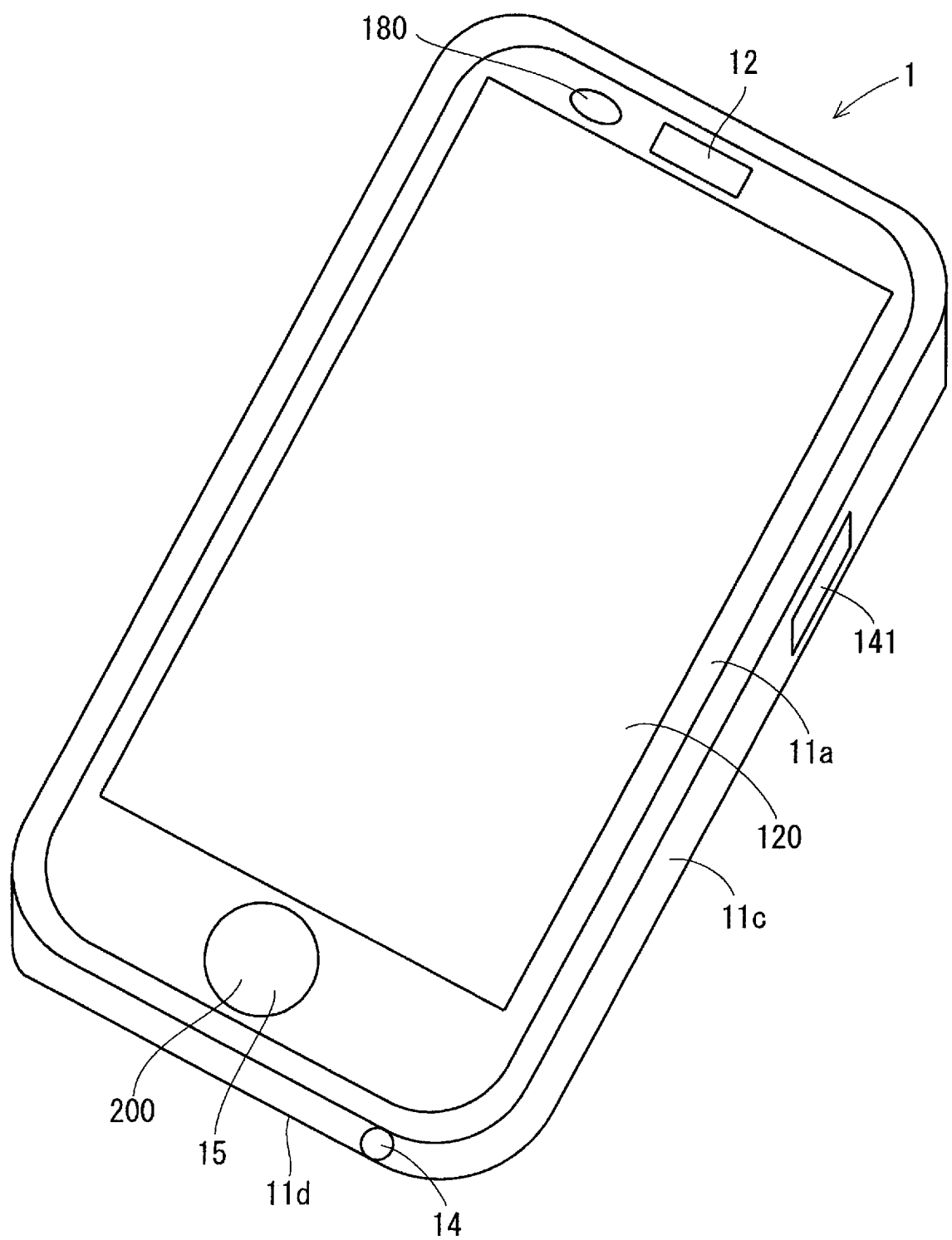
FIG. 1 illustrates a perspective view showing one example of an external appearance of an electronic apparatus.
Figure 2:
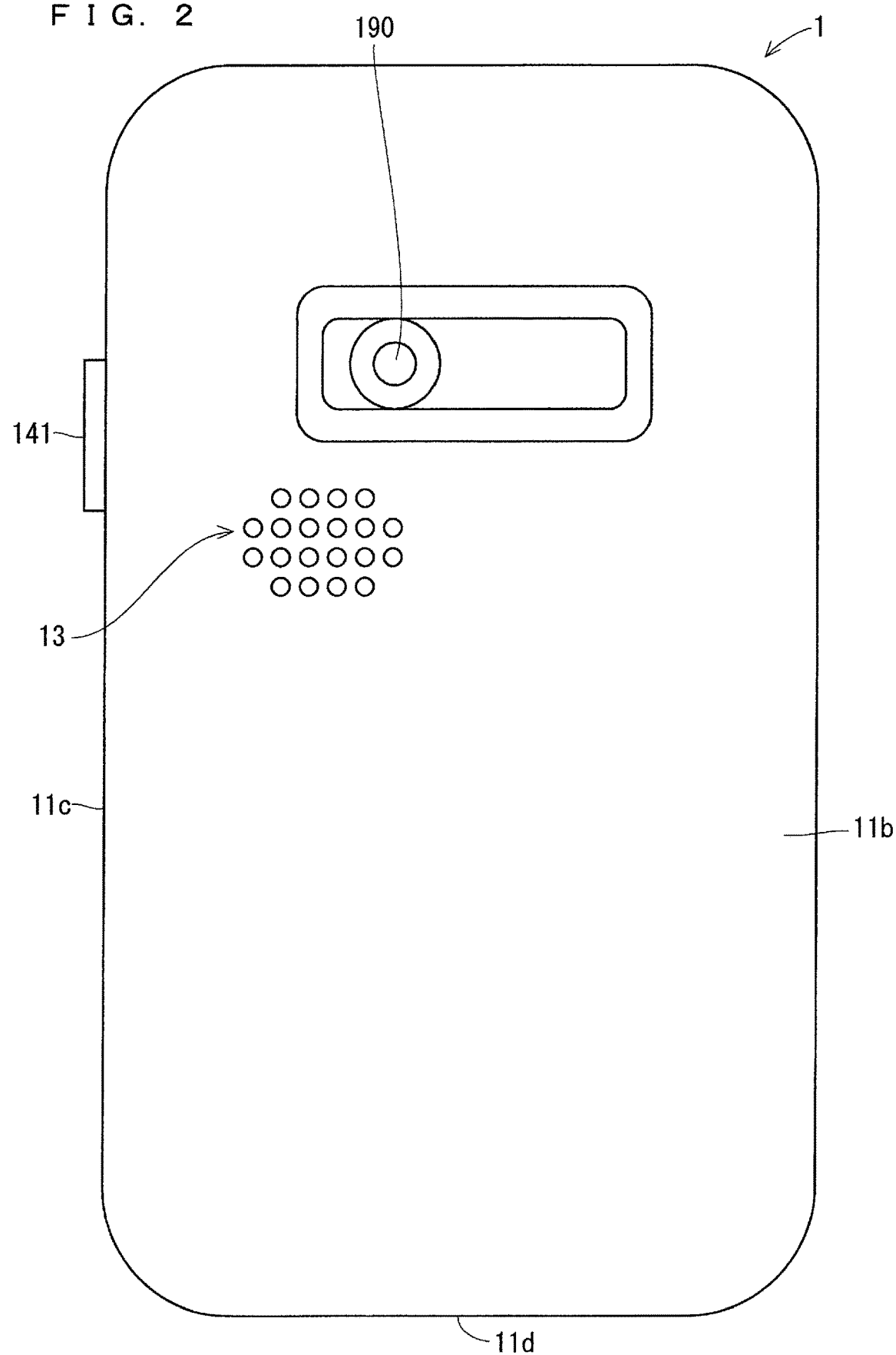
FIG. 2 illustrates a back view showing one example of the external appearance of the electronic apparatus.

FIGS. 1 and 2 are a perspective view and a back view showing one example of an external appearance of an electronic apparatus 1, respectively.

A display 120, in which various types of information such as characters, symbols, and graphics are displayed, is located in a front surface 11a of the electronic apparatus 1. A touch sensor 130 is located on a back surface side of the display 120. A user can input various types of information to the electronic apparatus 1 by operating the display 120 in the front surface of the electronic apparatus 1 with his/her finger, for example. The user can also input the various types of information to the electronic apparatus 1 by operating the display 120 with a pen for the touch panel such as a stylus pen, for example, instead of an operator such as his/her finger.

A receiver hole 12 is located in an upper end of the front surface 11a of the electronic apparatus 1. A microphone hole 14 is located in a side surface 11d in a lower side of the electronic apparatus 1. A lens included in a first camera 180 can be visually recognized from the upper end of the front surface 11a of the electronic apparatus 1. As shown in FIG. 2, a lens included in a second camera 190 can be visually recognized from a back surface 11b of the electronic apparatus 1, in other words, an upper end of a back surface of the electronic apparatus 1. A speaker hole 13 is located in the back surface 11b of the electronic apparatus 1.

A detection object surface 15 is located in a lower end of the front surface 11a of the electronic apparatus 1. The electronic apparatus 1 can detect an operation, for example, performed on the detection object surface 15 by a fingerprint sensor 200. The detection object surface 15 is also referred to as a detection object region. A location of the detection object surface 15 is not limited to that in the example in FIG. 1 but may be located on the display 120, for example.

The electronic apparatus 1 comprises an operation button group 140 comprising a plurality of operation buttons. Each operation button is a hardware button, for example, and is located in a surface of the electronic apparatus 1. Each operation button is a press button, for example. The operation button group 140 comprises a power source button 141. The power source button 141 is located in a side surface 11c of the electronic apparatus 1.

The operation button group 140 comprises an operation button other than the power source button 141. For example, the operation button group 140 includes a volume button.

Figure 3:
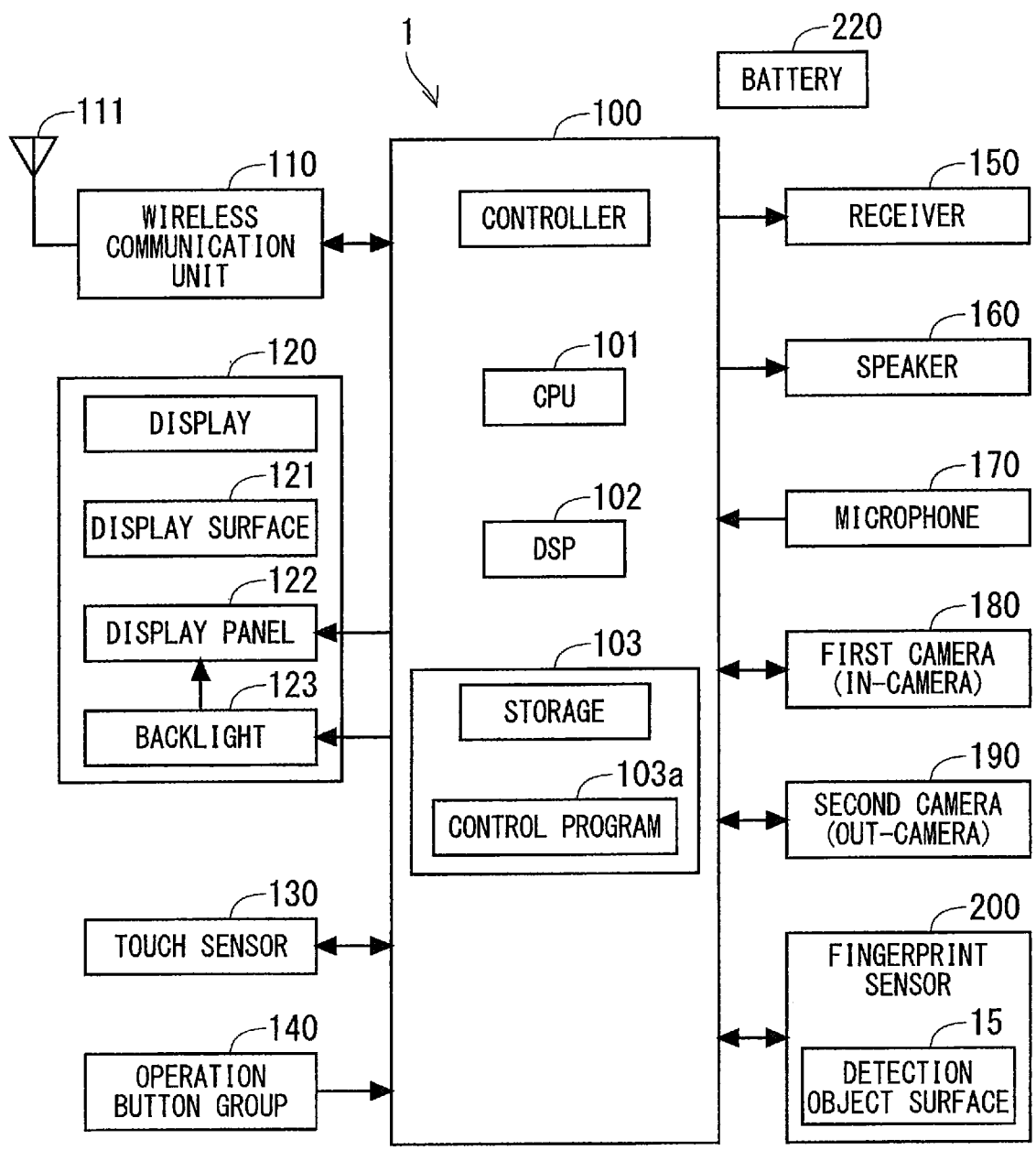
FIG. 3 illustrates a block diagram showing one example of a configuration of the electronic apparatus.

FIG. 3 is a block diagram mainly showing one example of an electrical configuration of the electronic apparatus 1. As shown in FIG. 3, the electronic apparatus 1 comprises a controller 100, a wireless communication unit 110, the display 120, the touch sensor 130, and the operation button group 140. The electronic apparatus 1 further comprises a receiver 150, a speaker 160, a microphone 170, the first camera 180, the second camera 190, the fingerprint sensor 200, and a battery 220.

The controller 100 controls the other components of the electronic apparatus 1 to be able to collectively manage the operation of the electronic apparatus 1. The controller 100 is also considered as a control device or a control circuit. The controller 100 includes at least one processor for providing control and processing capability to execute various functions as described in further detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to execute one or more data computing procedures or processes. The firmware is a discrete logic component, for example.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In one embodiment, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 1. The CPU 101 and the DSP 102 execute the various control programs 103a in the storage 103 to achieve various functions of the controller 100.

The controller 100 may comprise a plurality of CPUs 101. In this case, the controller 100 may comprise a main CPU having a high processing capacity to perform comparative complex processing and a sub CPU having a low processing capacity to perform comparative simple processing. The controller 100 may not comprise the DSP 102 or may comprise a plurality of DSPs 102. All or some of the functions of the controller 100 may be achieved by a hardware circuit that needs no software to achieve the functions above.

The storage 103 may comprise a non-transitory computer readable recording medium other than the ROM and the RAM. The storage 103 may comprise, for example, a compact hard disk drive and a solid state drive (SSD).

The plurality of control programs 103a in the storage 103 include various applications (that is to say, application programs). The storage 103 stores, for example, a call application to perform a voice call and a video call and a mail application to create, browse, send, and receive an e-mail. The storage 103 stores a camera application for taking an image of an object using the first camera 180 and the second camera 190 and an image application for displaying a still image recorded in the storage 103, for example. The storage 103 stores fingerprint information which is registered in the electronic apparatus 1 in advance. The storage 103 may store at least one application in the storage 103 in advance. The electronic apparatus 1 may download the at least one application in the storage 103 from the other device and store it in the storage 103.

The wireless communication unit 110 comprises an antenna 111. The wireless communication unit 110 can perform a wireless communication in several types of communication systems, for example, using the antenna 111. The controller 100 controls the wireless communication of the wireless communication unit 110.

The wireless communication unit 110 can perform a wireless communication with a base station of a mobile phone system. The wireless communication unit 110 can communicate with a mobile phone different from the electronic apparatus 1 or a web server via a network such as the base station and Internet. The electronic apparatus 1 can perform a data communication, a voice call, and a video call with the other mobile phone, for example.

The electronic apparatus 1 can perform a wireless communication using the wireless communication unit 110 and a wireless local area network (LAN) such as Wifi. The wireless communication unit 110 can perform a near field wireless communication. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to obtain information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111.

The display 120 comprises the display surface 121 located in the front surface 11a of the electronic apparatus 1, a display panel 122, and a backlight 123. The display 120 can display various types of information in the display surface 121. The display panel 122 is, for example, a liquid crystal display panel and comprises a plurality of pixels (also referred to as "a pixel unit" or "a pixel circuit"). The display panel 122 comprises a liquid crystal, a glass substrate, and a polarization plate, for example. The display panel 122 faces the display surface 121 in the electronic apparatus 1. The information displayed in the display 120 is displayed on the display surface 121 located in the surface of the electronic apparatus 1. The backlight 123 emits light to the display panel 122 from a rear side of the display panel 122. The backlight 123 comprises at least one light-emitting diode (LED), for example. The display panel 122 can control a transmission amount of light transmitted from the backlight 123 by pixel unit under control of the controller 100. The display panel 122 can display the various types of information. When the controller 100 controls each pixel of the display panel 122 in a state where the backlight 123 is turned on, the display 120 can display the various types of information such as characters, signs, and graphics. The controller 100 can control the backlight 123. The controller 100 can turn on and off the backlight 123.

The display panel 122 may be a display panel other than the liquid crystal display panel. For example, the display panel 122 may be a self-luminous display panel such as an organic electroluminescence (EL) panel. The backlight 123 is not necessary in the above case.

The touch sensor 130 can detect an operation performed on the display 120 with the operator such as a finger. The touch sensor 130 is considered as a sensor detecting the operation performed on the display 120. The touch sensor 130 is, for example, a projected capacitive touch sensor. The touch sensor 130 is located on a rear side of the display 120, for example. When the user performs the operation on the display 120 with the operator such as his/her finger, the touch sensor 130 can input, to the controller 100, an electrical signal in accordance with the operation. The controller 100 can specify contents of the operation performed on the display 120 based on the electrical signal (output signal) from the touch sensor 130. The controller 100 can perform the processing in accordance with the specified operation contents. An in-cell display panel in which a touch sensor is incorporated may be adopted instead of the display panel 122 and the touch sensor 130.

When the user operates each operation button of the operation button group 140, the operation button can output to the controller 100 an operation signal indicating that the operation button has been operated. The controller 100 can determine whether or not each operation button has been operated for each operation button. The controller 100 to which the operation signal is input controls the other component, thereby causing the electronic apparatus 1 to execute the function allocated to the operated operation button.

The microphone 170 can convert a sound being input from the outside of the electronic apparatus 1 into an electrical sound signal and then output the electrical sound signal to the controller 100. The sound from the outside of the electronic apparatus 1 is taken inside the electronic apparatus 1 through the microphone hole 14 and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 13. The user can hear the sound being output from the speaker hole 13 in a place apart from the electronic apparatus 1.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 12. A volume of the sound being output through the receiver hole 12 is set to be smaller than a volume of the sound being output through the speaker hole 13. The user brings the receiver hole 12 close to his/her ear, thereby being able to hear the sound being output through the receiver hole 12. A vibration element such as a piezoelectric vibration element for causing a portion of the front surface of the electronic apparatus 1 to vibrate may be provided instead of the receiver 150. In this case, the sound is transmitted to the user in a form of the vibration of the portion of the front surface.

The first camera 180 comprises the lens, an image sensor, and so on. The second camera 190 comprises the lens, an image sensor, and so on. Each of the first camera 180 and the second camera 190 can take an image of an object under control of the controller 100, generate a still image or a video of the object, and then output the still image or the video to the controller 100.

The lens of the first camera 180 can be visually recognized from the front surface 11a of the electronic apparatus 1. Accordingly, the first camera 180 can take an image of an object located on a front surface side (in other words, a display 120 side) of the electronic apparatus 1. The first camera 180 is referred to as an in-camera. In the meanwhile, the lens of the second camera 190 can be visually recognized from the back surface 11b of the electronic apparatus 1. Accordingly, the second camera 190 can take an image of an object located on a back surface side of the electronic apparatus 1. The second camera 190 is referred to as an out-camera.

The fingerprint sensor 200 can read fingerprint information of the finger touching the detection object surface 15. The fingerprint sensor 200 can detect an operation performed by the operator such as the finger on the detection object surface 15. For example, the fingerprint sensor 200 can detect a slide operation and a flick operation performed by the operator on the detection object surface 15. The slide operation refers to an operation of moving an operator such as the finger, which is kept in contact with an operation object surface, on the operation object surface. The operation object surface is a surface detecting the operation performed by the finger, for example. The operation object surface may include the detection object surface 15. The operation object surface may include the display. The flick operation refers to an operation of flicking the operation object surface with the operator such as the finger. The operation performed by the operator on the operation object surface is referred to as "the movement operation" in some cases hereinafter.

For example, the fingerprint sensor 200 can detect the movement operation in the right and left direction and an up and down direction performed on the detection object surface 15. The detection object surface 15 is a portion with which a finger 500 comes directly in contact. The detection object surface 15 may be a surface touched by the finger 500 of the user so that the fingerprint sensor 200 reads the fingerprint information and may be a region capable of detecting the fingerprint. The location of the fingerprint sensor 200 is not limited to that in the above configuration. For example, the fingerprint sensor 200 may be located on a lower side of the detection object surface 15. A part of the fingerprint sensor 200 may be the detection object surface 15.

A fingerprint detection system in the fingerprint sensor 200 is, for example, a capacitance system. Since the capacitance between the fingerprint sensor 200 and the finger changes in accordance with an unevenness caused by the fingerprint, the fingerprint sensor 200 can read the fingerprint information of the finger by detecting the capacitance between the fingerprint sensor 200 and the finger. When the fingerprint detection system in the fingerprint sensor 200 is the capacitance system, the fingerprint sensor 200 can detect the movement operation performed on the detection object surface 15 in the manner similar to the capacitive touch sensor 130.

The fingerprint sensor 200 may be made up of two separated sensors of a sensor reading the fingerprint information of the finger touching the detection object surface 15 and a sensor detecting the movement operation performed on the detection object surface 15. A system other than the capacitance system may also be adopted as the fingerprint detection system in the fingerprint sensor 200. For example, an optical system may be adopted as the fingerprint detection system in the fingerprint sensor 200.

The battery 220 can output a power source for the electronic apparatus 1. The battery 220 is, for example, a rechargeable battery. The power source being output from the battery 220 is supplied to various components such as the controller 100 and the wireless communication unit 110 included in the electronic apparatus 1.

The electronic apparatus 1 may comprise a sensor other than the touch sensor 130 and the fingerprint sensor 200. For example, the electronic apparatus 1 may comprise at least one of an accelerometer, an atmospheric pressure sensor, a geomagnetic sensor, a temperature sensor, a proximity sensor, an illuminance sensor, and a gyro sensor.

The electronic apparatus 1 has a large number of operation modes. The operation modes of the electronic apparatus 1 include, for example, a normal mode, a sleep mode, and a shutdown mode. In the shutdown mode, the electronic apparatus 1 is shut down, and most functions of the electronic apparatus 1 are suspended. In the sleep mode, some functions of the electronic apparatus 1, including a display function, are suspended. Operating in the normal mode means that the electronic apparatus 1 operates in a mode other than the sleep mode and the shutdown mode. The controller 100 sets the operation mode of the electronic apparatus 1 by controlling predetermined components of the electronic apparatus 1 in accordance with the operation mode to be set.

In the sleep mode, for example, some components of the electronic apparatus 1, including the display panel 122, the backlight 123, the touch sensor 130, the first camera 180, and the second camera 190, do not operate. In the shutdown mode, most components of the electronic apparatus 1, including the display panel 122, the backlight 123, the touch sensor 130, the first camera 180, and the second camera 190, do not operate. In the sleep mode, the electronic apparatus 1 consumes less power than in the normal mode. In the shutdown mode, the electronic apparatus 1 consumes less power than in the sleep mode.

In the sleep mode and the shutdown mode, the display 120 enters a non-display mode. A display state indicates a state where the electronic apparatus 1 purposely displays information on the display 120. The non-display state indicates a state where the electronic apparatus 1 does not purposely display the information on the display 120. In one embodiment, when the backlight 123 is turned off, the electronic apparatus 1 cannot purposely display the information on the display 120. Accordingly, if the backlight 123 is turned off, the display 120 enters the non-display state. In other words, when the backlight 123 is not driven, the display 120 is in the non-display state. In a case where the display panel 122 is a self-luminous display panel such as an organic EL panel, when no pixel emits light, the display 120 is in the non-display state. That is to say, when the whole region in the display region of the display panel 122 is in the lighting-off state, the display 120 is in the non-display state.

If the power source button 141 is pressed for a long time in the normal mode, the display 120 displays a confirmation screen to confirm with the user about whether or not to make the operation mode transition from the normal mode to the shutdown mode. If the user performs a predetermined operation on the display 120 in a state where the display 120 displays the confirmation screen, the operation mode transitions from the normal mode to the shutdown mode.

If no operation is performed on the electronic apparatus 1 for a given period of time or more in the normal mode, the operation mode transitions from the normal mode to the sleep mode. The operation mode transitions from the normal mode to the sleep mode when the power source button 141 is pressed for a short time in the normal mode.

In the meanwhile, the operation mode transitions from the sleep mode to the normal mode when the power source button 141 is pressed for a short time in the sleep mode. That is to say, when the power source button 141 is pressed for a short time in the sleep mode, the functions suspended at transition to the sleep mode are restored in the electronic apparatus 1. The normal mode includes a lock mode in one embodiment. The operation mode transitions from the sleep mode to the lock mode when the power source button 141 is pressed for a short time in the sleep mode. The operation mode transitions from the sleep mode to the normal mode when a predetermined operation is performed on the detection object surface 15 in the sleep mode.

The normal mode includes the operation mode of the electronic apparatus 1 described below other than the shutdown mode and the sleep mode without a particular description. The operation mode simply means the operation mode of the electronic apparatus 1. An operation of pressing the surface of the electronic apparatus 1 for a short time without changing a press position, that is to say, an operation of pressing the surface of the electronic apparatus 1 for a first given period of time or less without changing a press position is referred to as "a short press operation". An operation of pressing the surface of the electronic apparatus 1 for a long time without changing a press position, that is to say, an operation of pressing the surface of the electronic apparatus 1 for a second given period of time or more (≥ the first given period of time) without changing a press position is referred to as a "long press operation" in some cases.

Figure 4:
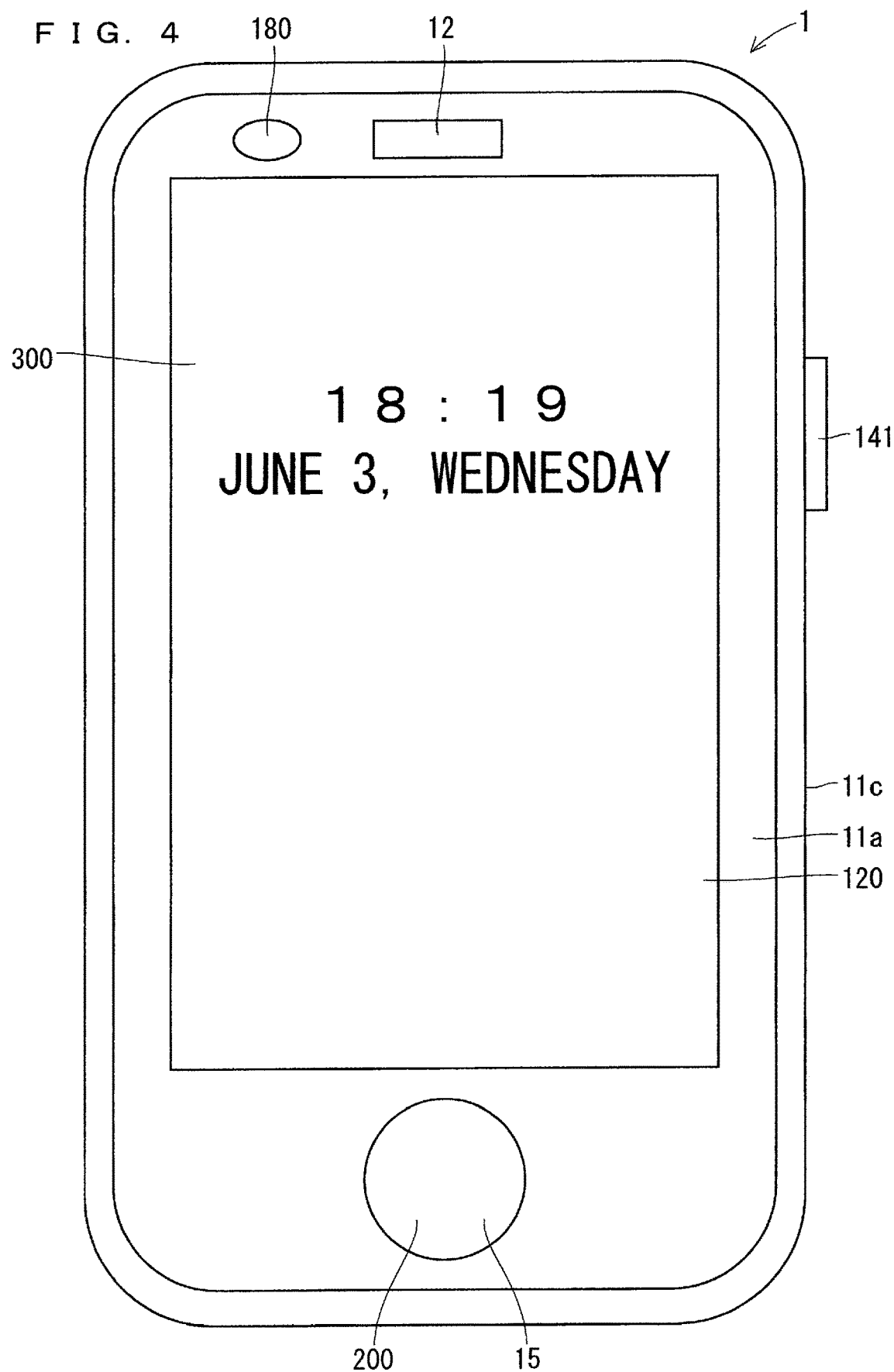
FIG. 4 illustrates a drawing showing one example of a display of the electronic apparatus.
Figure 5:
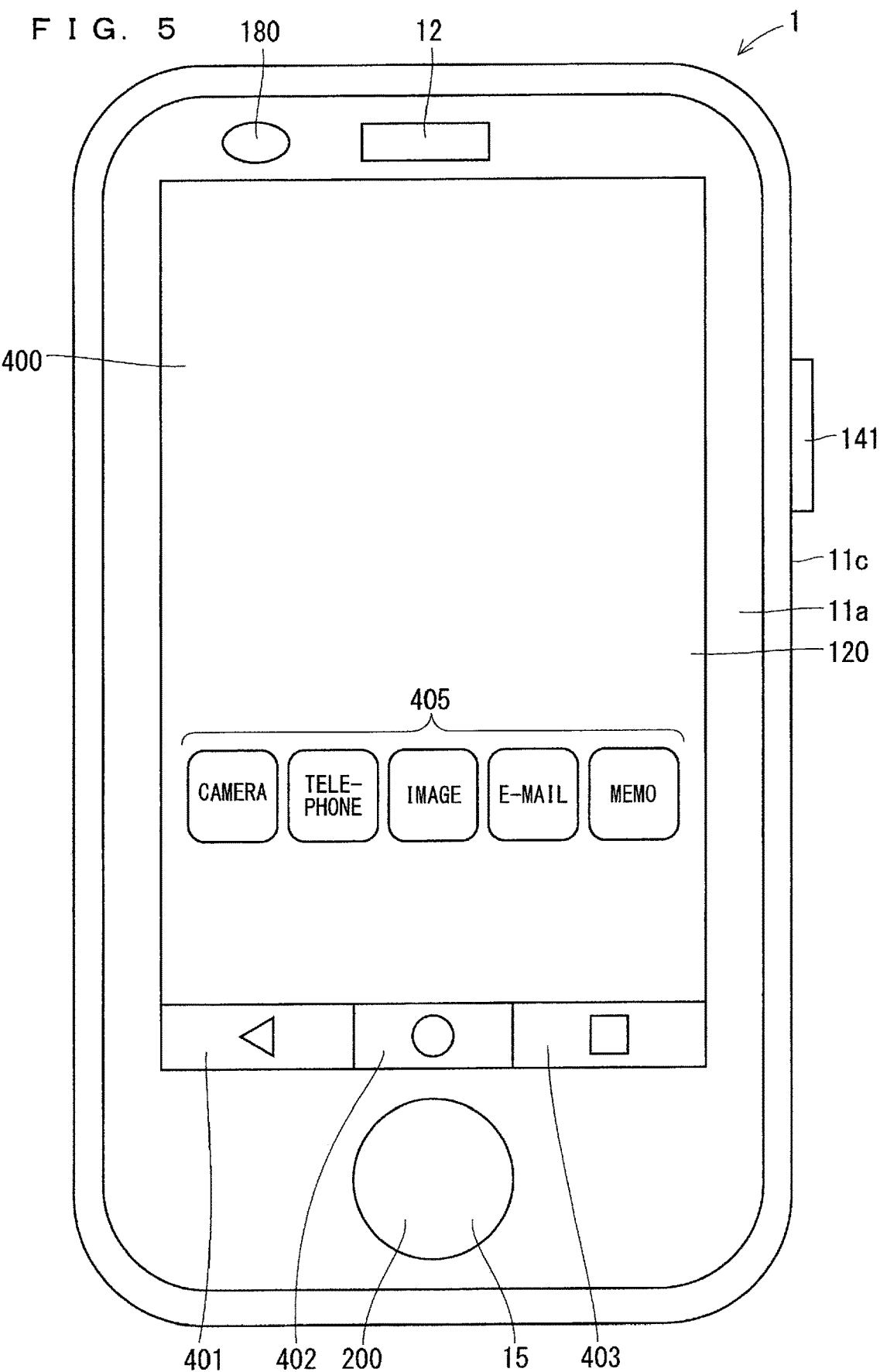
FIG. 5 illustrates a drawing showing one example of a display of the electronic apparatus.

The display 120 displays various screens in the normal mode. The screen displayed on the display 120 is also deemed to be an image displayed on the display 120. The display 120 displays a home screen 400 and a lock screen 300, for example. FIG. 4 illustrates a drawing showing one example of the lock screen 300. FIG. 5 illustrates a drawing showing one example of the home screen 400.

As shown in FIG. 4, the lock screen 300 indicates a current time, a current date, and a current day, for example.

The normal mode includes a lock mode in which the user cannot make the electronic apparatus 1 execute any applications other than specific applications of a plurality of applications stored in the storage 103. The specific applications indicate, for example, a call application and a camera application. The lock mode is also referred to as the screen lock mode. In the lock mode, the user cannot instruct the electronic apparatus 1 to execute each of the applications other than the specific applications of the plurality of applications stored in the storage 103. The lock screen 300 is a screen notifying that the electronic apparatus 1 is in the lock mode, and is displayed on the display 120 when the operation mode is the lock mode. The lock mode is a mode in which the user cannot execute some or all of the applications in the storage 103.

When the short press operation is performed on the power source button 141 in the sleep mode, the sleep mode is canceled, and the operation mode of the electronic apparatus 1 transitions to the lock mode. In the lock mode, the controller 100 displays the lock screen 300 on the display 120. When the user performs a predetermined operation on the electronic apparatus 1 during display of the lock screen 300 on the display 120, the lock mode of the electronic apparatus 1 is canceled, and the display on the display 120 transitions from the lock screen 300 to another screen, such as the home screen 400 (refer to FIG. 5), for example. A state where the lock mode has been canceled in the normal mode is also referred to as an "unlock mode" in some cases hereinafter.

The home screen 400 shows a plurality of operation buttons 401 to 403 as shown in FIG. 5. Each of the operation buttons 401 to 403 is a software button. The operation buttons 401 to 403 are also shown in a screen other than the home screen 400 in the unlock mode.

The operation button 401 is a back button, for example. The back button is an operation button for switching a display on the display 120 to an immediately preceding display. The user performs a predetermined operation on the operation button 401 to switch the display on the display 120 to the immediately preceding display. For example, the user performs a tap operation on the operation button 401 to switch the display on the display 120 to the immediately preceding display. The tap operation refers to an operation of the user taking the finger off a touch position on the operation object surface right after touching the operation object surface. The operation button 402 is a home button, for example. The home button is an operation button for making the display 120 display the home screen 400. When the user performs the tap operation on the operation button 402, for example, the display 120 displays the home screen 400. The operation button 403 is a history button, for example. The history button is an operation button to display a history of an application executed by the electronic apparatus 1 on the display 120. When the user performs the tap operation on the operation button 403, for example, the display 120 displays a history of the applications executed by the electronic apparatus 1.

The home screen 400 shows icons 405, corresponding to the applications in the storage 103, for instructing the electronic apparatus 1 to execute the corresponding applications. In the example in FIG. 5, the home screen 400 shows five icons 405. The icons are icons for executing applications of camera, telephone, image, e-mail, and memo. The application of camera is an application for providing a function of taking a picture or a video, for example. The application of telephone is an application for providing a call function, for example. The application of image is an application for providing a function of displaying a stored picture or a stored video, for example. The application of e-mail is an application providing a function of transmitting and receiving a message, for example. The application of memo is an application for providing a function of storing a written text, for example. The user can select the icon 405 by performing a predetermined operation on the icon 405. The controller 100 reads, from the storage 103, an application corresponding to the selected icon 405 and executes the application. That is to say, when the touch sensor 130 detects the predetermined operation performed on the icon 405, the controller 100 reads, from the storage 103, the application corresponding to the icon 405 and executes the application. The user can select the icon 405 by operating the icon 405 and make the electronic apparatus 1 execute the application corresponding to the selected icon 405. For example, when the user performs the tap operation on the icon 405 corresponding to a browser, the electronic apparatus 1 executes the browser. When the user performs the tap operation on the icon 405 corresponding to the camera application, the electronic apparatus 1 executes the camera application.

A plurality of pages constitute the home screen 400. FIG. 5 illustrates a page of the home screen 400. Each page shows the operation buttons 401 to 403 and the icons 405. The plurality of pages constituting the home screen 400 are virtually arranged in the right and left direction. When the user performs the flick operation or the slide operation in the right and left direction on the display 120, the display 120 displays the adjacent page.

When the operation mode is the normal mode, the controller 100 can perform a fingerprint authentication based on the fingerprint information being read by the fingerprint sensor 200. One example of the fingerprint authentication is described below.

In the fingerprint authentication, the controller 100 generates a fingerprint image indicating the fingerprint information being read by the fingerprint sensor 200 based on an output signal from the fingerprint sensor 200. Then, the controller 100 extracts a feature point indicating a feature of the fingerprint information, which has been read, from the generated fingerprint image. Applied to the feature point are, for example, positions of an end point and a branch point of a ridge line (a convex portion) of the fingerprint and a thickness of the ridge line. Then, the controller 100 compares the extracted feature point and a reference feature point stored in the storage 103. The reference feature point is a feature point extracted from a fingerprint image showing fingerprint information of an authorized user. The authorized user is an owner of the electronic apparatus 1, for example. The controller 100 determines that the fingerprint authentication has succeeded if the extracted feature point and the reference feature point are similar to each other as a result of comparison. The fingerprint authentication is one type of user authentication, and thus it can be said that the controller 100 determines that the user having the fingerprint information being read by the fingerprint sensor 200 is the authorized user if the extracted feature point and the reference feature point are similar to each other. On the other hand, the controller 100 determines that the fingerprint authentication has failed if the extracted feature point and the reference feature point are not similar to each other. This means that the controller 100 determines that the user having the fingerprint information being read by the fingerprint sensor 200 is an unauthorized user.

The normal mode includes a fingerprint registration mode for registering the fingerprint information of the user in the electronic apparatus 1. The electronic apparatus 1 operates in the fingerprint registration mode when a predetermined operation is performed on the display 120 in the unlock mode. When the authorized user places his/her finger (particularly, a finger pad) on the detection object surface 15 in the fingerprint registration mode, the fingerprint sensor 200 reads the fingerprint information of his/her finger. The controller 100 generates a fingerprint image indicating the fingerprint information being read by the fingerprint sensor 200 based on an output signal from the fingerprint sensor 200. Then, the controller 100 extracts a feature point from the generated fingerprint image, and stores the extracted feature point in the storage 103 as the reference feature point. The reference feature point representing features of the fingerprint of the authorized user is stored in the storage 103. This means that the fingerprint information of the authorized user is registered in the electronic apparatus 1. The fingerprint information which has been previously registered in the electronic apparatus 1 in this manner is referred to as registered fingerprint information.

In some cases, a plurality of reference feature points are stored in the storage 103. In this case, the controller 100 compares the extracted feature point with each of the plurality of reference feature points stored in the storage 103. The controller 100 determines that the fingerprint authentication has succeeded if the extracted feature point is similar to any of the plurality of reference feature points. On the other hand, the controller 100 determines that the fingerprint authentication has failed if the extracted feature point is similar to none of the plurality of reference feature points.

Figure 6:
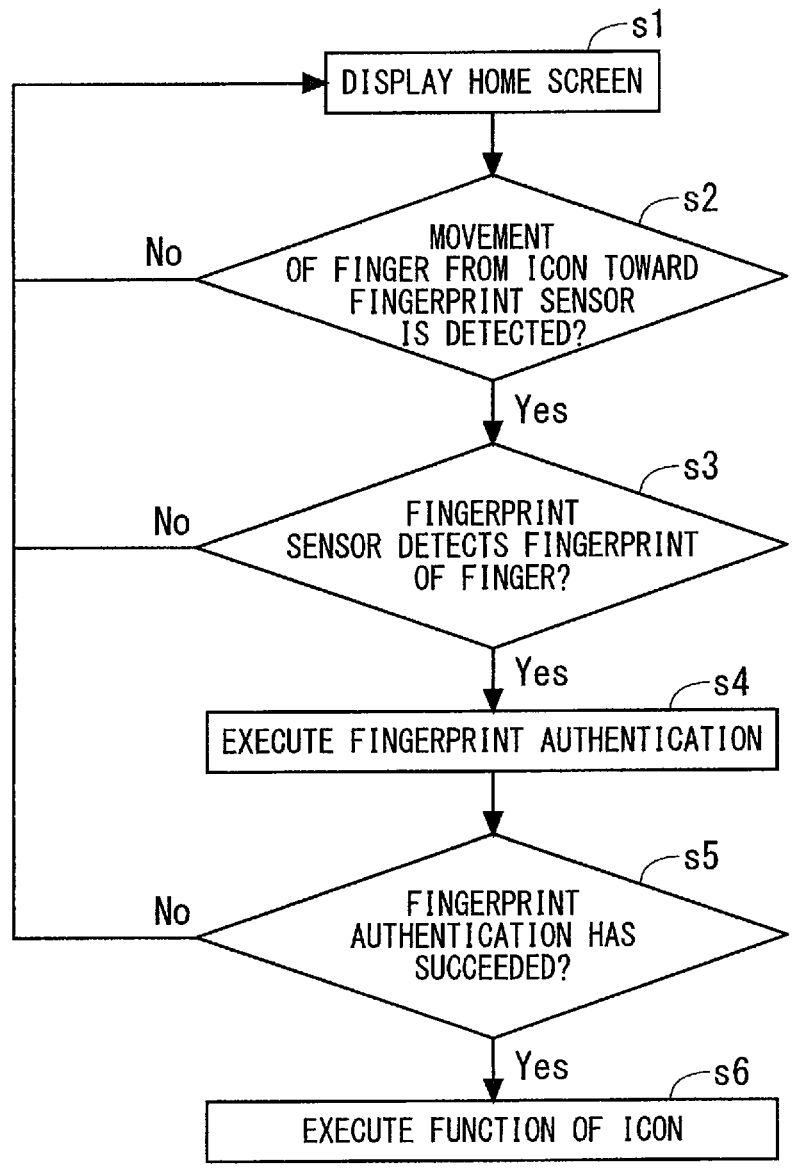
FIG. 6 illustrates a flow chart showing one example of an operation of the electronic apparatus.

In one embodiment, if a movement of the finger 500 from the icon 405 toward the fingerprint sensor 200 is detected and the sensor 200 reads the fingerprint information, the electronic apparatus 1 executes the function of the icon 405 based on the fingerprint information which has been read and the registered fingerprint information which has been previously registered. FIG. 6 is a flow chart showing one example of an operation Of the electronic apparatus 1 when the electronic apparatus 1 executes the function of the icon 405.

Figure 7:
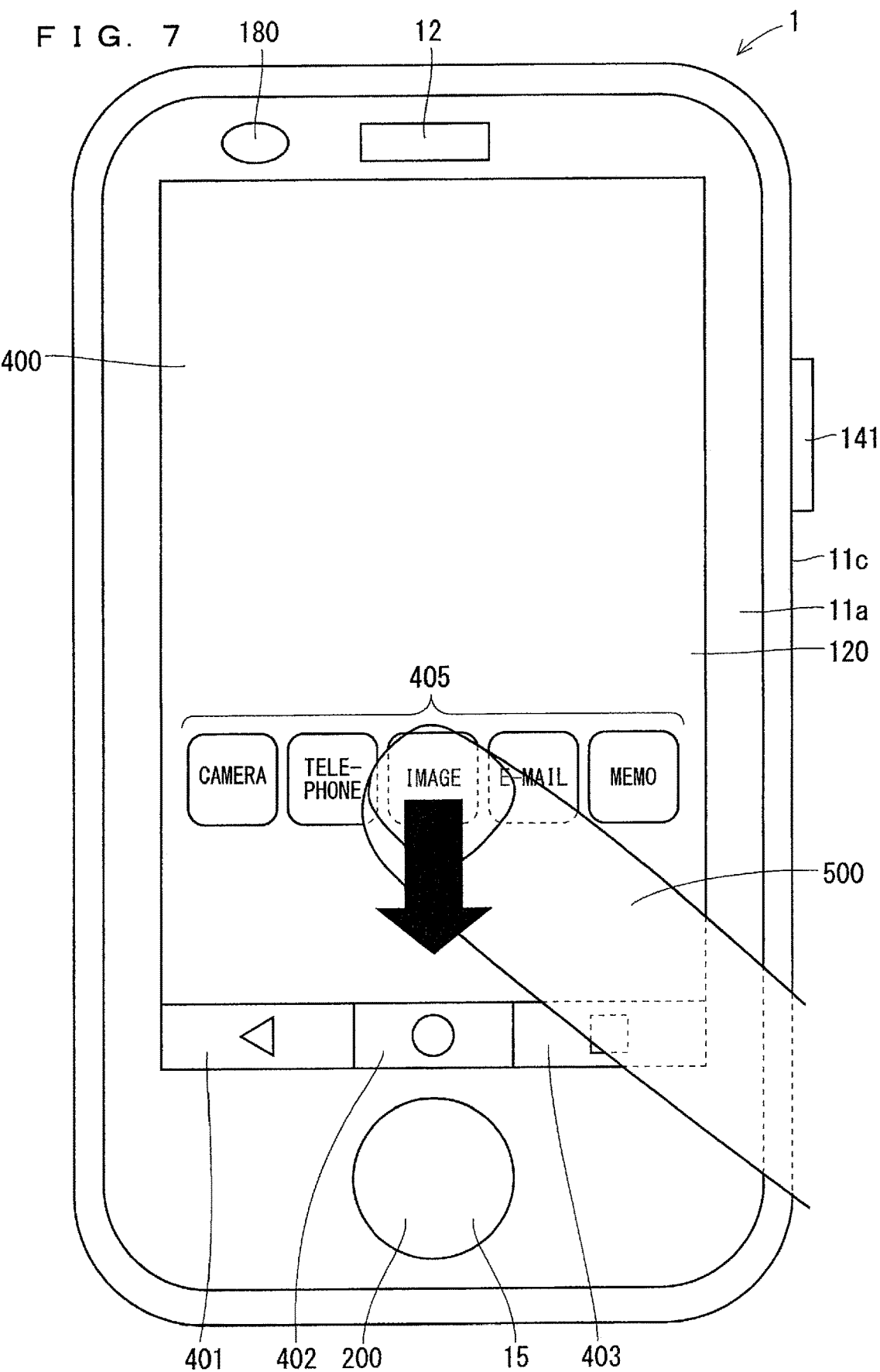
FIG. 7 illustrates a drawing showing one example of an operation performed on the electronic apparatus.

In Step s1, the controller 100 displays the home screen 400 on the display 120. In Step s2, upon detecting the movement of the finger 500 from the icon 405 toward the fingerprint sensor 200, the controller 100 selects the icon 405, and proceeds with the processing to Step s3. FIG. 7 illustrates a drawing showing one example of an operation performed on the electronic apparatus. Specifically, FIG. 7 illustrates a drawing showing that the finger 500 touches the icon 405 of the image application, and subsequently moves toward the fingerprint sensor 200 while being in contact with the display 120.

In Step s2, for example, if the controller 100 detects a contact with the icon 405 and determines that the contact moves from a position where the contact is detected in a direction approaching the fingerprint sensor 200 in accordance with the detection result of the touch sensor 130, the controller 100 detects that the movement of the finger 500 is the movement from the icon 405 toward the fingerprint sensor 200. The direction approaching the fingerprint sensor 200 is a downward direction in FIG. 7, for example. For example, if the controller 100 detects a contact with the icon 405 and determines that a position where the contact is detected moves in a direction distancing from the fingerprint sensor 200, the controller 100 determines that the movement of the finger 500 is not the movement from the icon 405 toward the fingerprint sensor 200. The direction distancing from the fingerprint sensor 200 is an upward, left lower, or right lower direction in FIG. 7, for example.

The movement of the finger 500 from the icon 405 toward the fingerprint sensor 200 includes a movement of the finger 500 reaching the fingerprint sensor 200 described below, for example. The movement of the finger 500 from the icon 405 toward the fingerprint sensor 200 includes a movement of the finger 500 at a predetermined speed or more not reaching the fingerprint sensor 200 described below, for example.

In Step s2, the controller 100 may move the icon 405 in association with the movement of the finger 500 upon detecting the movement of the finger 500 from the icon 405 toward the fingerprint sensor 200. For example, if the finger 500 moves from the icon 405, the electronic apparatus 1 may move and display the icon 405 to follow the movement of the finger 500. However, it is also applicable that the controller 100 does not move the icon 405 even if the movement of the finger 500 from the icon 405 toward the fingerprint sensor 200 is detected.

If the movement of the finger 500 from the icon 405 toward the fingerprint sensor 200 is not detected in Step s2, the electronic apparatus 1 may maintain the display of the home screen.

If the fingerprint sensor detects the fingerprint of the finger 500 based on the output signal from the fingerprint sensor 200 in Step s3, the controller 100 proceeds with the processing to Step s4.

If the fingerprint sensor does not detect the fingerprint of the finger in Step s3, the controller 100 may maintain the display of the home screen. For example, if the movement of the finger 500 from the icon 405 toward the fingerprint sensor 200 is detected but the fingerprint sensor 200 has not read the fingerprint of the finger 500 even after an elapse of a predetermined period of time, the electronic apparatus 1 may maintain the display of the home screen.

In Step s4, the controller 100 performs the fingerprint authentication based on the fingerprint information being read by the fingerprint sensor 200. After Step s4, the controller 100 determines whether or not the fingerprint authentication has succeeded in Step s5. If the controller 100 determines that the fingerprint authentication has succeeded, the processing proceeds to Step s6.

If the fingerprint authentication has failed in Step s5, the electronic apparatus 1 maintains the display of the home screen. If the fingerprint authentication has failed, the controller 100 may display information notifying that the fingerprint authentication has failed on the home screen 400. The information notifying that the fingerprint authentication has failed is displayed when the fingerprint authentication has failed, thus the user can easily recognize that the fingerprint authentication has failed.

The controller 100 reads, from the storage 103, an application corresponding to the icon 405 selected in Step s2 and executes the function in Step s6. The application corresponding to the icon 405 selected in Step s2 is the application of image in FIG. 7, for example. The authorized user performs the operation of touching the icon 405 with his/her finger 500 and moving the finger 500 in the direction toward the fingerprint sensor 200, thereby being able to make the electronic apparatus 1 execute the function of the icon 405. Furthermore, the function of the icon 405 is not executed simply by the contact of the finger 500 with the icon 405, thus a malfunction can be reduced. In one embodiment, it is possible, by setting the movement of the finger 500 toward the fingerprint sensor 200 as a condition to execute the function of the icon 405, to reduce a malfunction that the fingerprint authentication can be performed by the finger 500 which does not move from the icon 405 toward the fingerprint sensor 200 if the user intends to change the position of the icon 405, for example. As a result, operability of the electronic apparatus 1 is improved.

Described herein is one example of the electronic apparatus 1 in the case where the movement of the finger 500 includes the movement of the finger 500 reaching the fingerprint sensor 200 in the movement of the finger 500 from the icon 405 toward the fingerprint sensor 200.

In one embodiment, if it is detected that the movement of the finger 500 is the movement reaching the fingerprint sensor 200 and the fingerprint information is read, the electronic apparatus 1 executes the function of the icon 405 based on the fingerprint information and the registered fingerprint information. FIG. 8 is a flow chart showing one example of an operation of the electronic apparatus 1 when the electronic apparatus 1 executes the function of the icon 405. The processing described above is performed in Step s1 to Step s6 in FIG. 8.

In Step s7, it is determined that the movement of the finger 500 from the icon 405 toward the fingerprint sensor 200 reaches the fingerprint sensor. If the movement of the finger 500 reaches the fingerprint sensor 200, the processing proceeds to Step s3.

If the movement of the finger 500 does not reach the fingerprint sensor 200 in Step s7, the electronic apparatus 1 may maintain the display of the home screen.

Figure 9:
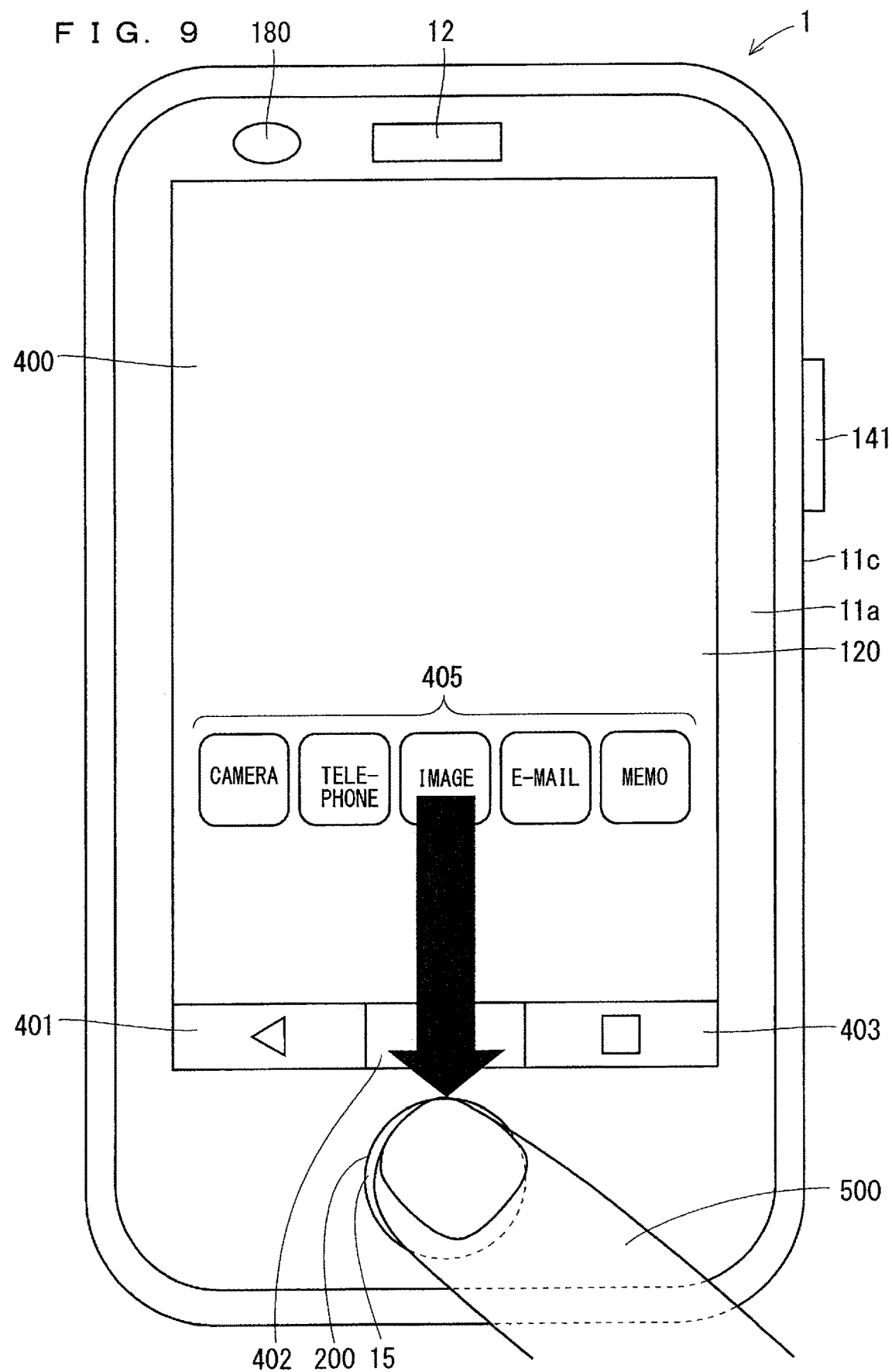
FIG. 9 illustrates a drawing showing one example of an operation performed on the electronic apparatus.

FIG. 9 illustrates a drawing showing one example of an operation performed on the electronic apparatus. FIG. 9 illustrates a drawing showing that the finger 500 in FIG. 7 moves while being in contact with the display 120 of the electronic apparatus 1 to reach the position of the fingerprint sensor 200.

The movement of the finger 500 from the icon 405 toward the fingerprint sensor 200 may include a portion where the movement of the finger 500 between the fingerprint sensor 200 and the touch sensor 130 is not detected. The portion where the movement of the finger 500 is not detected is the front surface 11a of the electronic apparatus 1, for example. In such a case, if the fingerprint sensor 200 reads the fingerprint information in a predetermined period of time after the touch sensor 130 detects that the movement of the finger 500 from the icon 405 toward the fingerprint sensor 200 reaches the front surface 11a of the electronic apparatus 1, it may be determined that the movement of the finger 500 from the icon 405 toward the fingerprint sensor 200 has been performed. The finger 500 in the portion where the movement of the finger 500 between the fingerprint sensor 200 and the touch sensor 130 is not detected may be moved while being in contact with the portion. It is also applicable that the finger 500 does not move in the portion where the movement of the finger 500 between the fingerprint sensor 200 and the touch sensor 130 is not detected but after the touch sensor 130 detects that the movement of the finger 500 from the icon 405 toward the fingerprint sensor 200 reaches the front surface 11a of the electronic apparatus 1, the finger 500 is separated from the electronic apparatus 1 and then comes in direct contact with the fingerprint sensor 200.

The authorized user performs the sequential operation of touching the icon 405 with his/her finger 500 and moving the finger 500 to the fingerprint sensor 200, thereby being able to make the electronic apparatus 1 execute the function of the icon 405. If the movement of the finger 500 from the icon 405 toward the fingerprint sensor 200 includes the portion where the movement of the finger 500 between the fingerprint sensor 200 and the touch sensor 130 is not detected, there is no need to display an authentication position of the fingerprint sensor 200 on the display 120, thus the fingerprint sensor 200 hindering the display of the display 120 can be suppressed. As a result, the operability of the electronic apparatus 1 is improved.

It is also applicable that if the function of the icon 405 is executed in accordance with the movement of the finger 500 from the icon 405 toward the fingerprint sensor 200, the controller 100 changes a display position of the icon 405 whose function is executed closer to the fingerprint sensor 200. The controller 100 may count a total number of executions of the function of the icon 405 in accordance with the movement of the finger 500 from the icon 405 toward the fingerprint sensor 200. The controller 100 may change the display position of the icons 405 so that they are located closer to the fingerprint sensor 200 in order of increasing number of execution of the function which has been counted. Accordingly, the display position of the icon 405 of the function which is executed with high frequency gets close to the fingerprint sensor 200, thus a distance of moving the finger 500 from the icon 405 to the fingerprint sensor 200 is reduced.

Described herein is one example of the electronic apparatus 1 in the case where the movement of the finger 500 from the icon 405 toward the fingerprint sensor 200 includes the movement of the finger 500 at a predetermined speed or more not reaching the fingerprint sensor 200.

In one embodiment, if the fingerprint information is read after it is detected that the movement of the finger 500 includes the movement at the predetermined speed or more and the movement of the finger 500 is the movement not reaching the fingerprint sensor 200, the electronic apparatus 1 executes the function of the icon 405 based on the fingerprint information and the registered fingerprint information.

For example, the movement of the finger 500, which includes the movement at a predetermined speed or more not reaching the fingerprint sensor 200, includes a first movement or a second movement. Each of the first movement and the second movement is the movement of the finger 500 from the icon 405 toward the fingerprint sensor 200, and is further the movement of the finger 500 not reaching the fingerprint sensor 200. The first movement has a movement speed from a position of the icon 405 to a position of finishing the movement which is a predetermined speed or more, for example. The second movement has a movement speed from a position of the icon 405 to a predetermined position which is a predetermined speed or less and a movement speed from the predetermined position to a position of finishing the movement which is a predetermined speed or more, for example.

Figure 10:
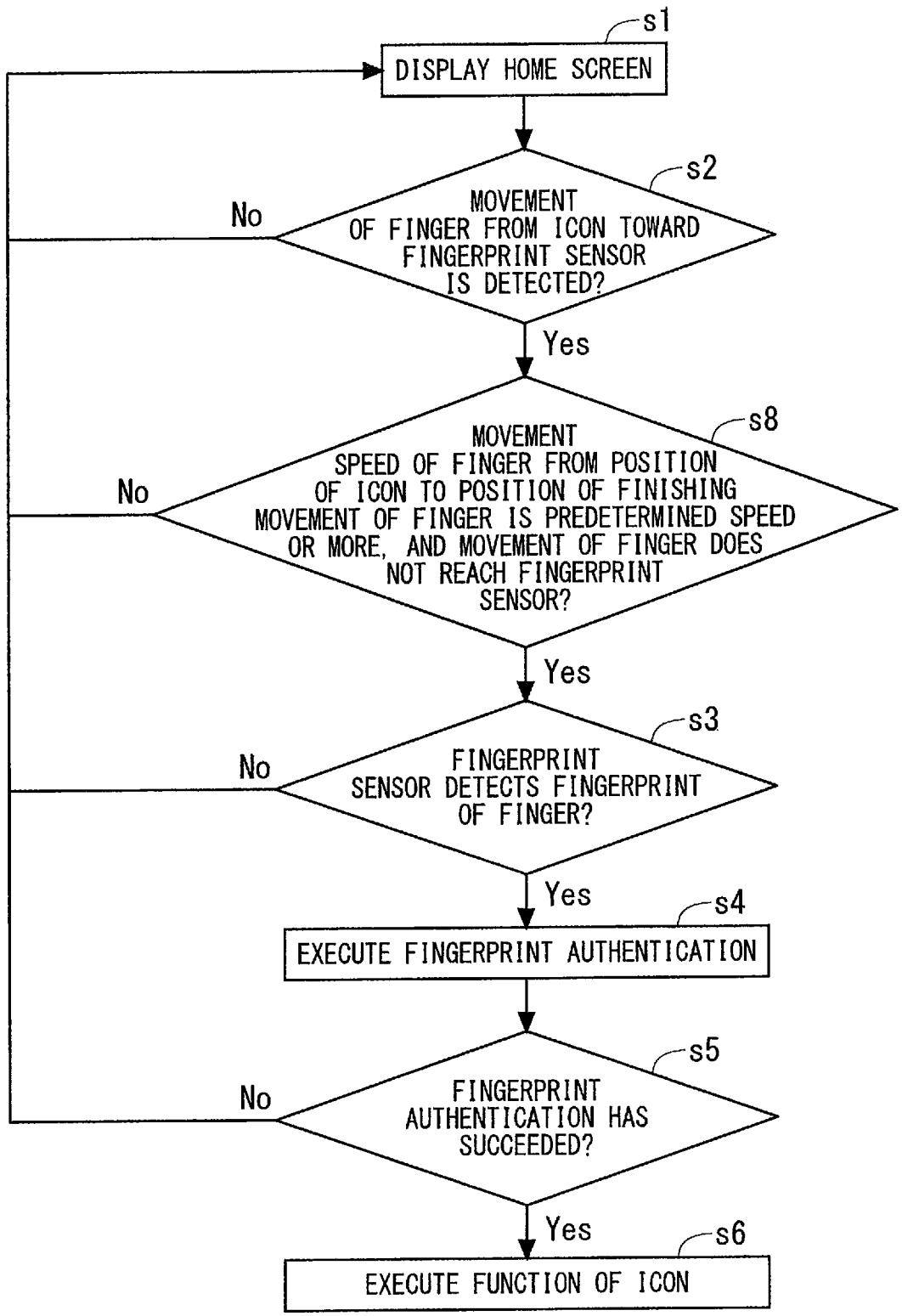
FIG. 10 illustrates a flow chart showing one example of an operation of the electronic apparatus.

If the fingerprint information is read after the first movement is detected, the electronic apparatus 1 executes the function of the icon 405 based on the fingerprint information and the registered fingerprint information. FIG. 10 is a flow chart showing one example of an operation of the electronic apparatus 1 when the electronic apparatus 1 executes the function of the icon 405. The processing described above is performed in Step s1 to Step s6 in FIG. 10.

It is determined in Step s8 whether the movement of the finger 500 has the movement speed from the position of the icon 405 to the position of finishing the movement, which is a predetermined speed or more, and does not reach the fingerprint sensor 200. If the movement of the finger 500 has the movement speed from the position of the icon 405 to the position of finishing the movement, which is a predetermined speed or more, and does not reach the fingerprint sensor, the processing proceeds to Step s3.

If the movement of the finger 500 has the movement speed of the finger not including a predetermined speed or more, or reaches the fingerprint sensor in Step s8, the electronic apparatus 1 may maintain the display of the home screen.

Figure 11:
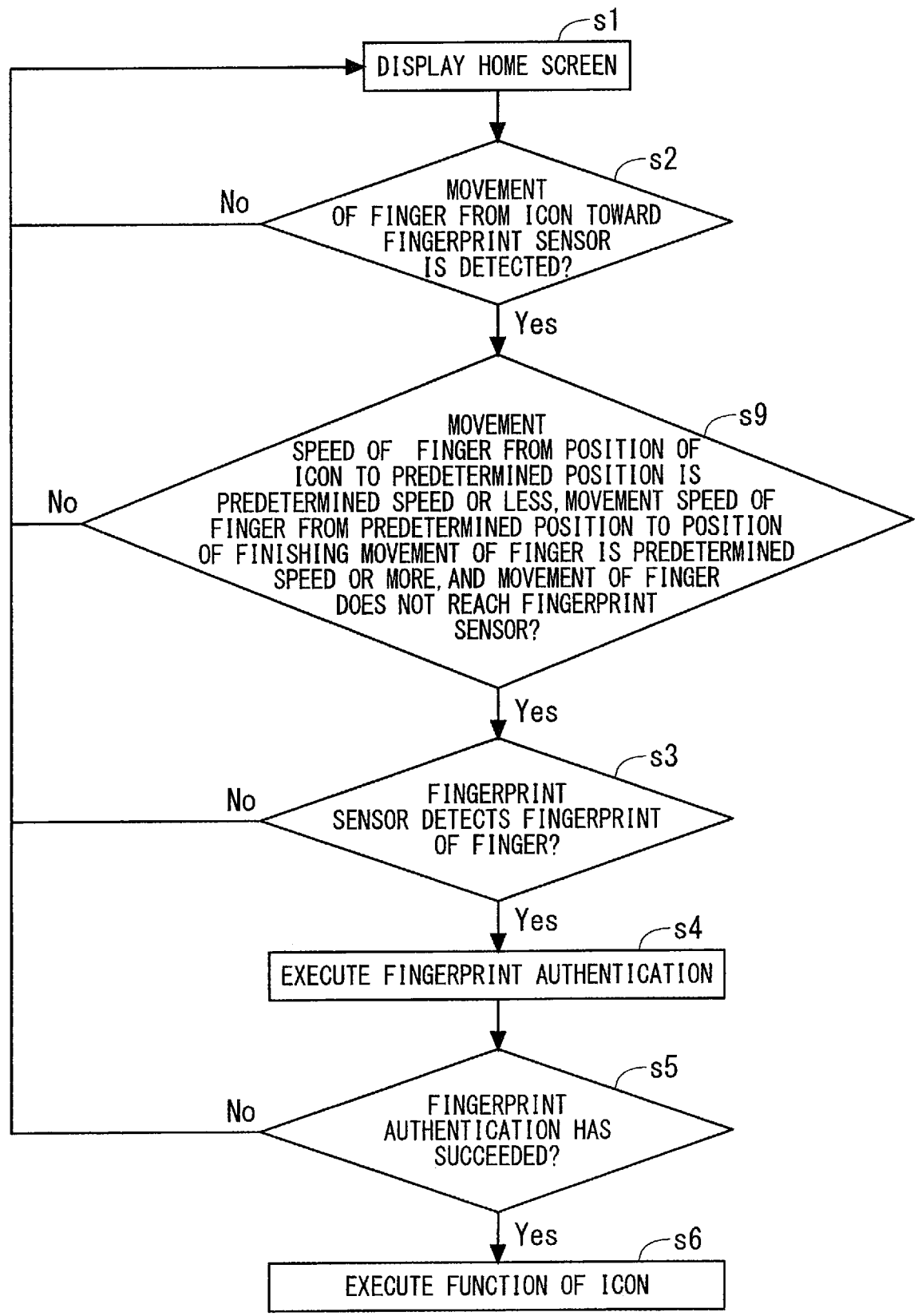
FIG. 11 illustrates a flow chart showing one example of an operation of the electronic apparatus.

If the fingerprint information is read after the second movement is detected, the electronic apparatus 1 executes the function of the icon 405 based on the fingerprint information and the registered fingerprint information. FIG. 11 is a flow chart showing one example of an operation of the electronic apparatus 1 when the electronic apparatus 1 executes the function of the icon 405. The processing described above is performed in Step s1 to Step s6 in FIG. 11.

It is determined in Step s9 whether the movement of the finger 500 has the movement speed from the position of the icon to the predetermined position, which is a predetermined speed or less, has the movement speed of the finger from the predetermined position to the position of finishing the movement of the finger, which is a predetermined speed or more, and does not reach the fingerprint sensor. If the movement of the finger 500 has the movement speed from the position of the icon to the predetermined position, which is the predetermined speed or less, has the movement speed of the finger from the predetermined position to the position of finishing the movement of the finger, which is the predetermined speed or more, and does not reach the fingerprint sensor, the processing proceeds to Step s3.

If the movement of the finger 500 has the movement speed of the finger not including the predetermined speed or more, or reaches the fingerprint sensor in Step s9, the electronic apparatus 1 may maintain the display of the home screen.

Figure 12:
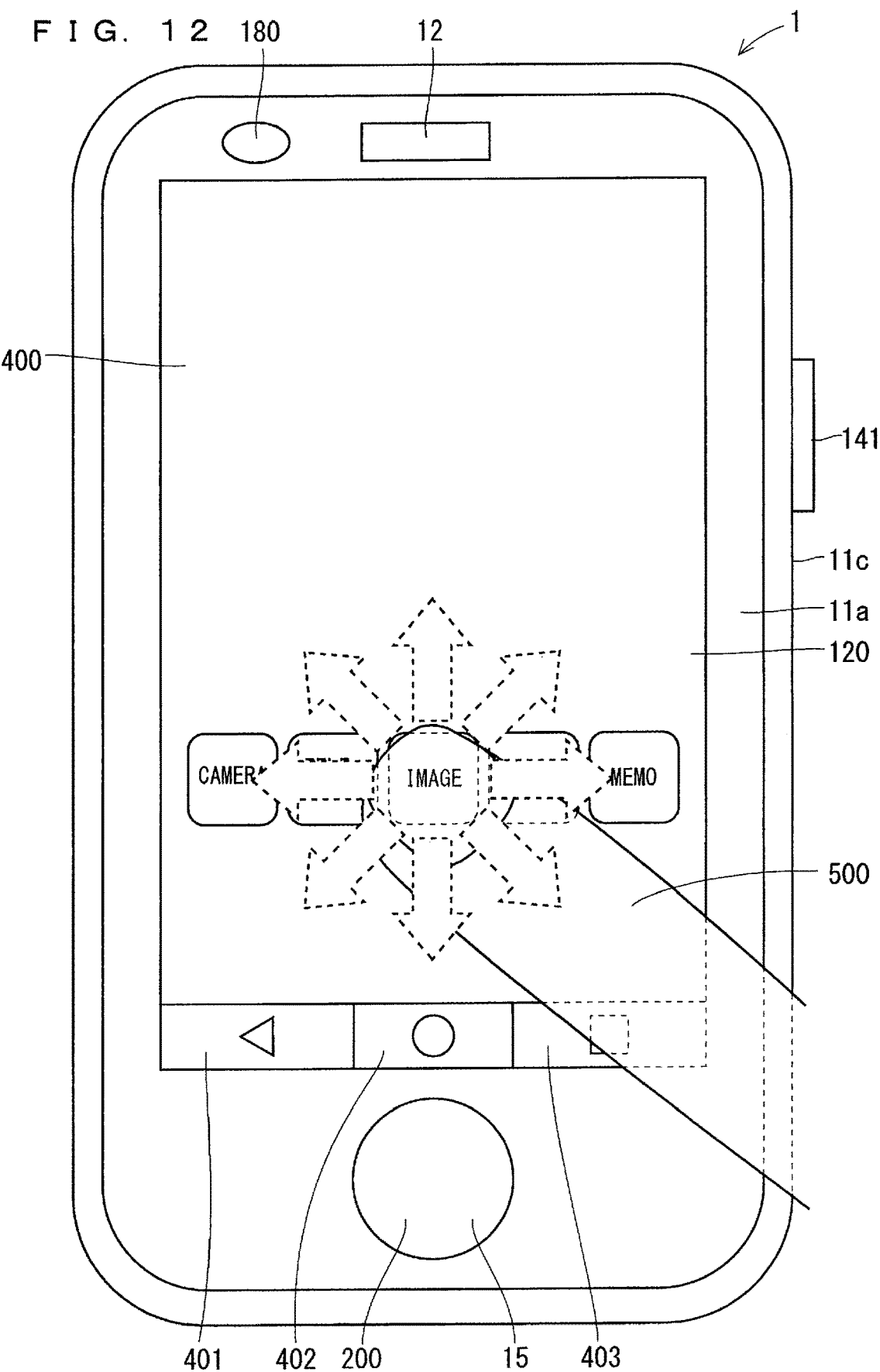
FIG. 12 illustrates a drawing showing one example of an operation performed on the electronic apparatus.

In one embodiment, the movement of the finger 500 for executing the function of the icon 405 is not limited to the movement from the icon 405 toward the fingerprint sensor 200, but may be the movement from the icon 405 in all directions as shown in FIG. 12.

Accordingly, the authorized user performs the operation of touching the icon 405 with his/her finger 500 and moving the finger 500 in the direction toward the fingerprint sensor 200 at a predetermined speed, thereby being able to make the electronic apparatus 1 execute the function of the icon 405. Furthermore, the function of the icon 405 is not executed simply by the contact of the finger 500 with the icon 405, thus a malfunction can be reduced. As a result, the operability of the electronic apparatus 1 is improved.

In one embodiment, if it is detected that the movement of the finger 500 includes the movement at the predetermined speed or more and the movement of the finger 500 is the movement not reaching the fingerprint sensor 200, the electronic apparatus 1 makes the display 120 display the screen 406 for requiring the fingerprint authentication.

Figure 13:
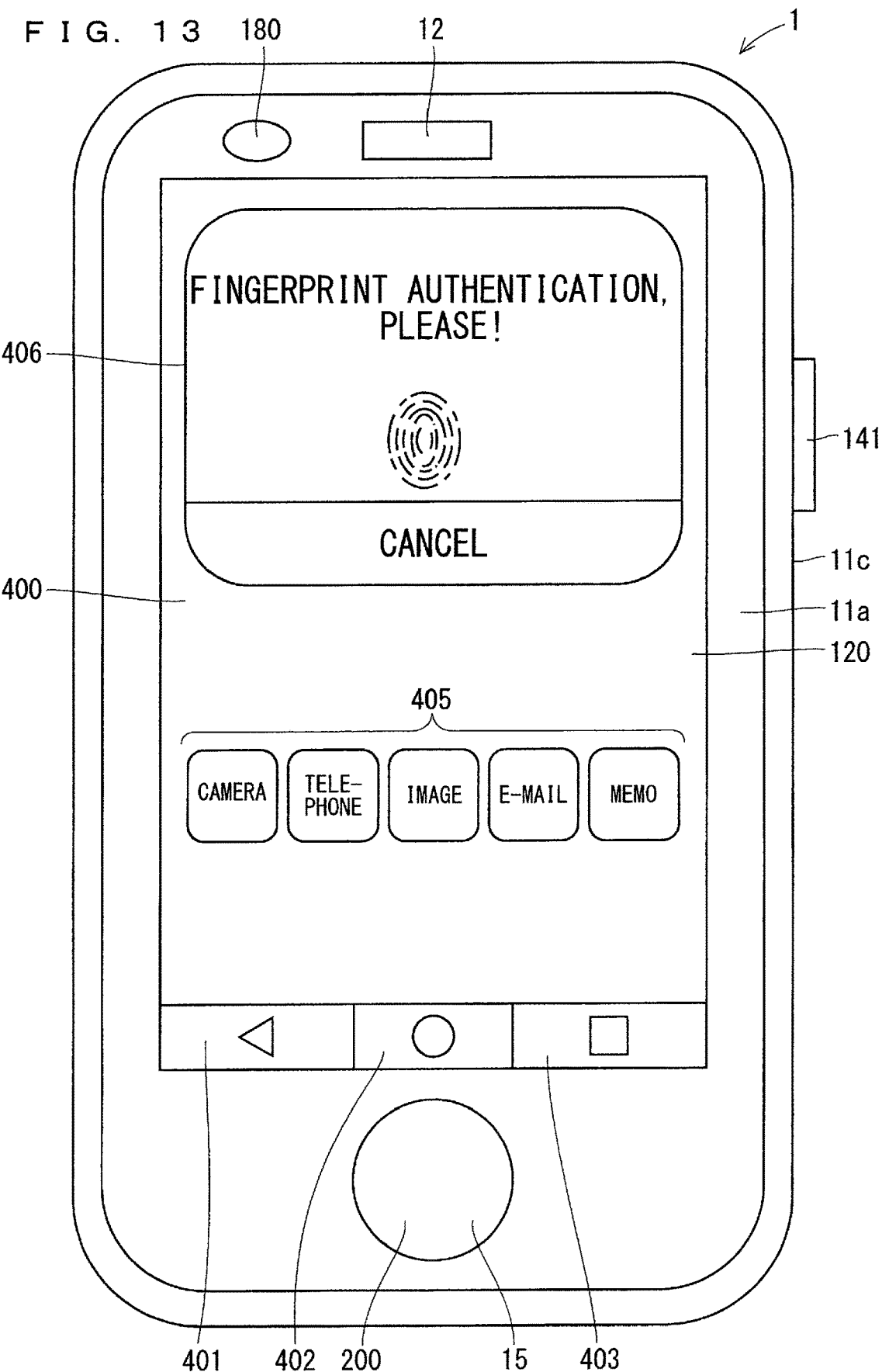
FIG. 13 illustrates a drawing showing one example of a display of the electronic apparatus.

FIG. 13 illustrates a drawing showing one example of the display of the electronic apparatus 1. Specifically, FIG. 13 illustrates a drawing showing that the electronic apparatus 1 displays the image 406 requiring the fingerprint authentication on the display 120.

If it is detected that the movement of the finger 500 includes the movement at the predetermined speed or more and the movement of the finger 500 is not the movement not reaching the fingerprint sensor 200, the controller 100 displays the image 406 on the display 120. The description of "it is detected that the movement of the finger 500 is the movement not reaching the fingerprint sensor 200" indicates that the determination is YES in Step s8 in FIG. 10 or in Step s9 in FIG. 11. The controller 100 may set a limitation so that the fingerprint sensor 200 cannot read the fingerprint information until the image 406 is displayed. The description of "until the image 406 is displayed" is, in other words, "until it is detected that the movement of the finger 500 includes the movement at the predetermined speed or more and the movement of the finger 500 is the movement not reaching the fingerprint sensor 200".

Since the electronic apparatus 1 displays the image 406 on the display 120, the user can recognize more easily from the image 406 that the electronic apparatus 1 is in a state of being able to perform the fingerprint authentication. As a result, the operability of the electronic apparatus 1 is improved.

The image 406 includes a predetermined region. The predetermined region indicates a region where a character of "cancel" is described in FIG. 13. If the region where the character of "cancel" is described is tapped by the finger 500 in FIG. 13, the electronic apparatus 1 may cancel a selection of the icon 405 selected in Step s2 in FIG. 6 to hide the image 406.

Figure 14:
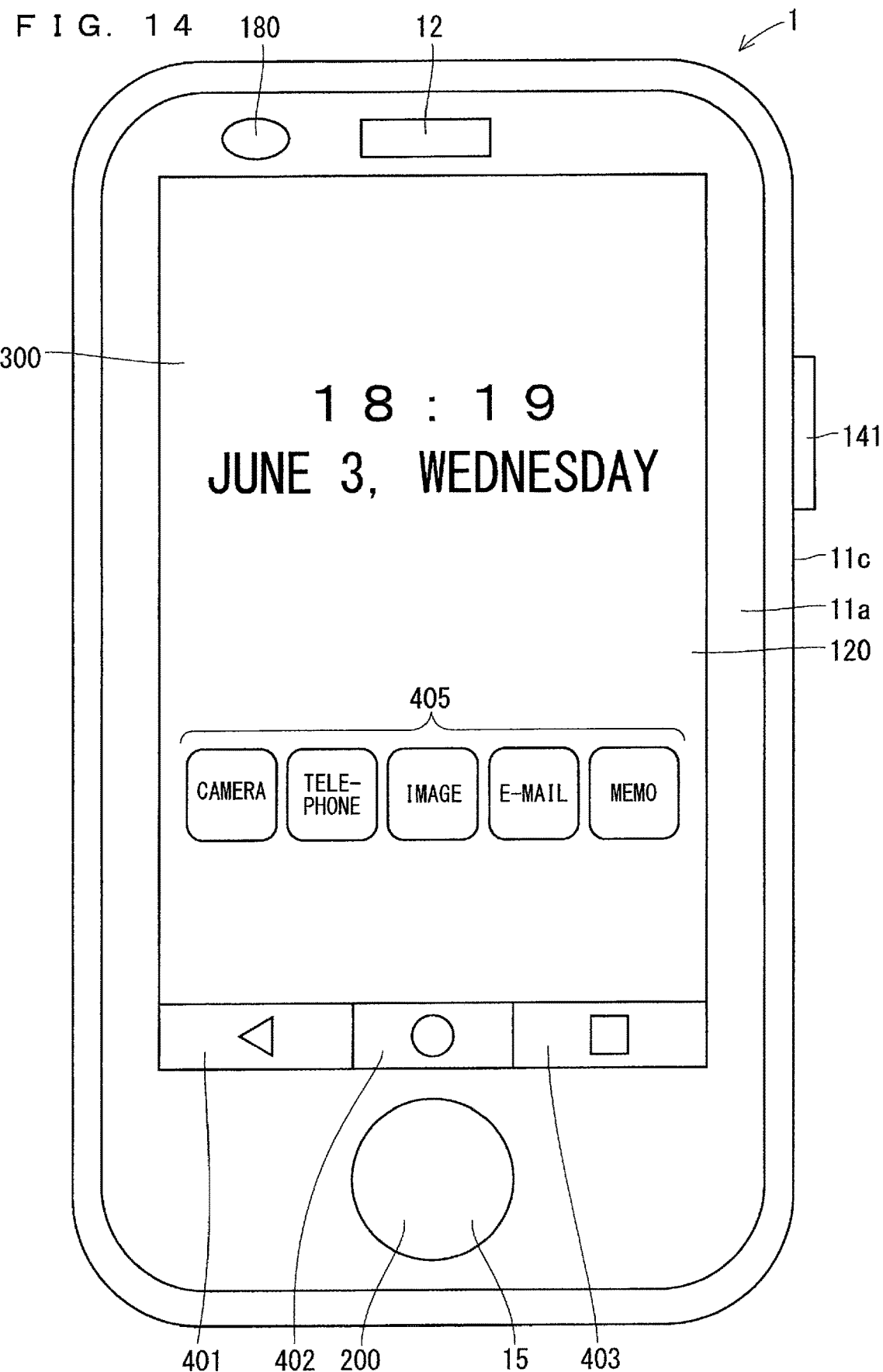
FIG. 14 illustrates a drawing showing one example of a display of the electronic apparatus.

In one embodiment, the electronic apparatus 1 displays the icon 405 on the display 120 in the lock mode. FIG. 14 illustrates a drawing showing one example of the display of the electronic apparatus 1. Specifically, FIG. 14 is a drawing showing that the icon 405 is displayed on the display 120 in the lock screen mode.

The electronic apparatus 1 displays the lock screen 300 on the display 120 in the lock mode. The electronic apparatus 1 displays the icon 405 on the lock screen 300. The electronic apparatus 1 can execute the application of the icon 405 in the state of displaying the lock screen 300, thereby having convenience. As a result, the operability of the electronic apparatus 1 is improved.

In one embodiment, if the movement of the finger 500 from the icon 405 toward the fingerprint sensor 200 is detected and the fingerprint sensor 200 reads the fingerprint information in the lock mode, the electronic apparatus 1 cancels the lock mode and executes the function of the icon 405 based on the fingerprint information which has been read and the registered fingerprint information.

Figure 15:
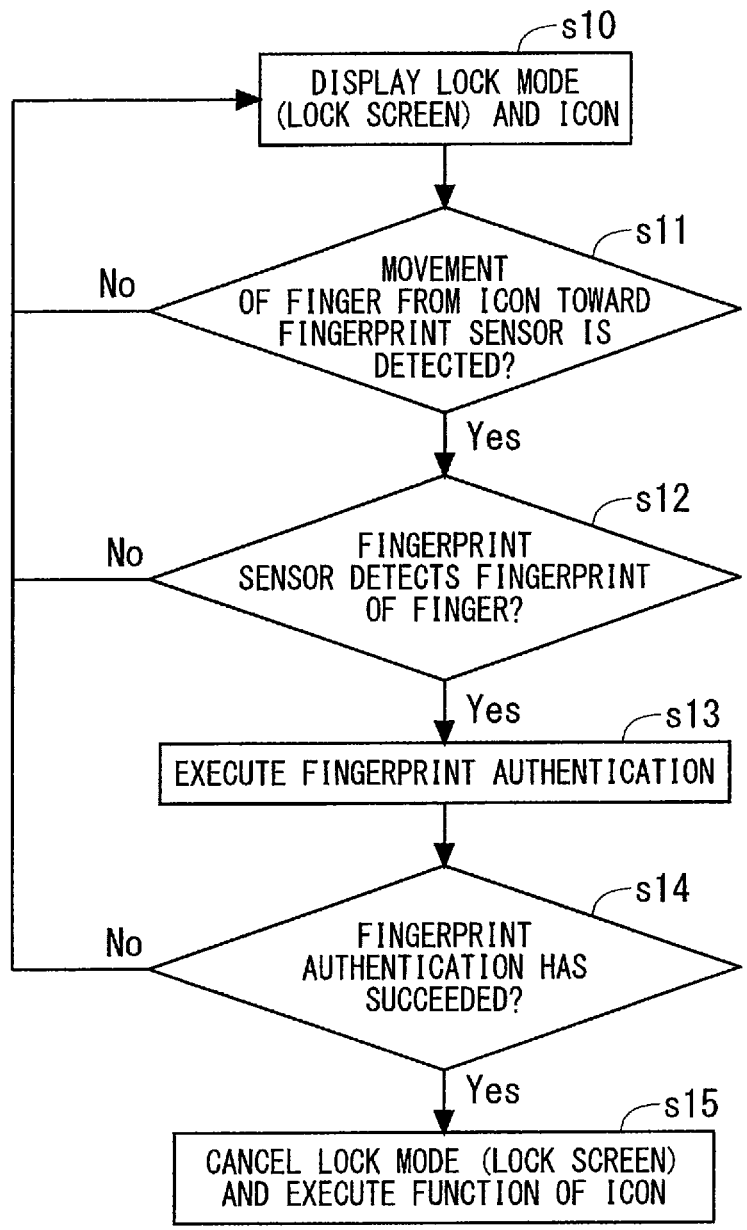
FIG. 15 illustrates a flow chart showing one example of an operation of the electronic apparatus.

FIG. 15 is a flow chart showing one example of an operation of the electronic apparatus. FIG. 15 is a flow chart showing one example of an operation of the electronic apparatus 1 when the electronic apparatus 1 executes the function of the icon 405 in the lock mode.

In Step s10, the controller 100 displays the lock screen 300 on the display 120 and also displays the icon 405 on the lock screen 300 in the manner similar to the electronic apparatus 1 in FIG. 14, and the controller 100 proceeds with the processing to Step s11. In Step s11, upon detecting the movement of the finger 500 from the icon 405 toward the fingerprint sensor 200, the controller 100 proceeds with the processing to Step s12.

If the fingerprint sensor detects the fingerprint of the finger 500 based on the output signal from the fingerprint sensor 200 in Step s12, the controller 100 proceeds with the processing to Step s13. In Step s13, the controller 100 performs the fingerprint authentication based on the fingerprint information being read by the fingerprint sensor 200. After Step s13, the controller 100 determines whether or not the fingerprint authentication has succeeded in Step s14.

If it is determined that the fingerprint authentication has succeeded in Step s14, the controller 100 cancels the lock mode in Step s15 and executes the function of the icon.

If it is determined that the fingerprint authentication has failed in Step s14, the controller 100 does not cancel the lock mode in Step s15.

As described above, in one embodiment, the function of the icon 405 to which the movement of the finger 500 is directed is not executed if the fingerprint authentication has failed, the display 120 maintains the display of the lock screen 300.

In Step s15 in FIG. 15, the lock mode is canceled and then the function of the icon is executed, however, any of the cancellation of the lock mode and the execution of the function of the icon 405 may be performed first. Alternatively, the cancellation of the lock mode and the execution of the function of the icon 405 may be performed at the same time.

The authorized user performs the operation of touching the icon 405 with his/her finger 500 and moving the finger 500 in the direction toward the fingerprint sensor 200 in the lock mode, thereby being able to cancel the lock mode and make the electronic apparatus 1 execute the function of the icon 405. Accordingly, the cancellation of the lock mode and the execution of the function of the icon 405 may be performed at the same time. As a result, the operability of the electronic apparatus 1 is improved.

In one embodiment, the icon 405 includes a first icon and a second icon, and the electronic apparatus 1 can register different types of registered fingerprint information in the first icon and the second icon, respectively.

For example, the electronic apparatus 1 may be able to register registered fingerprint information of a first user in the first icon and register registered fingerprint information of a second user in the second icon. The first icon is an icon of telephone in FIG. 5, for example, and the second icon is an icon of memo in FIG. 5, for example. The electronic apparatus 1 having such a configuration can easily set a function which can be executed only by the user or the other user when the electronic apparatus 1 is used by the user and the other user in common. As a result, the operability of the electronic apparatus 1 is improved.

Although the electronic apparatus 1 is a mobile phone, such as a smartphone, in the above-mentioned examples, the electronic apparatus 1 may be the other types of electronic apparatuses. The electronic apparatus 1 may be a tablet terminal, a personal computer, and a wearable apparatus, for example. The wearable apparatus adopted as the electronic apparatus 1 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus.

While the electronic apparatus 1 has been described above in detail, the above description is in all aspects illustrative and not restrictive. The various examples described above can be implemented in combination as long as they are not mutually inconsistent. It is understood that numerous examples which have not been exemplified can be devised without departing from the scope of the present disclosure.

The invention claimed is:

1. An electronic apparatus, comprising:
a display configured to display an icon;
a fingerprint sensor configured to read fingerprint information;
a touch sensor configured to detect a movement of a finger; and
at least one processor configured to execute, when the movement of the finger from the icon toward the fingerprint sensor is detected and first fingerprint information is read by the fingerprint sensor, a function of the icon when the first fingerprint information which has been read matches registered fingerprint information which has been previously registered, wherein
when the first fingerprint information is read after it is detected that the movement of the finger includes a movement having a predetermined speed or more and the movement of the finger is a movement not reaching the fingerprint sensor, the at least one processor executes the function of the icon when the fingerprint information matches the registered fingerprint information,
wherein when it is detected that the movement of the finger includes a movement having the predetermined speed or more and the movement of the finger is a movement not reaching the fingerprint sensor, the at least one processor displays a screen requiring a fingerprint authentication on the display.

2. The electronic apparatus according to claim 1, wherein when it is detected that the movement of the finger is a movement reaching the fingerprint sensor and the first fingerprint information is read, the at least one processor executes the function of the icon when the fingerprint information matches the registered fingerprint information.

3. The electronic apparatus according to claim 1, wherein the at least one processor displays the icon on the display in a lock mode.

4. The electronic apparatus according to claim 3, wherein when a movement of a finger from the icon toward the fingerprint sensor is detected and the first fingerprint information is read by the fingerprint sensor, the at least one processor cancels the lock mode and executes a function of the icon since the first fingerprint information which has been read matches the registered fingerprint information.

5. The electronic apparatus according to claim 1, wherein the icon includes a first icon and a second icon, and
the at least one processor is configured to register different types of registered fingerprint information in the first icon and the second icon, respectively.

6. A control method of an electronic apparatus comprising at least one processor, a display displaying an icon, a fingerprint sensor reading fingerprint information, and a touch sensor detecting a movement of a finger, comprising:
detecting by the touch sensor the movement of the finger from the icon toward the fingerprint sensor;
executing by the at least one processor, when first fingerprint information is read by the fingerprint sensor, a function of the icon when the first fingerprint information which has been read matches registered fingerprint information which has been previously registered, wherein when the first fingerprint information is read after it is detected that the movement of the finger includes a movement having a predetermined speed or more and the movement of the finger is a movement not reaching the fingerprint sensor, executing the function of the icon when the fingerprint information matches the registered fingerprint information; and
when it is detected that the movement of the finger includes a movement having the predetermined speed or more and the movement of the finger is a movement not reaching the fingerprint sensor, displaying a screen requiring a fingerprint authentication on the display.

7. An electronic apparatus, comprising:
a display configured to display an icon;
a fingerprint sensor configured to read fingerprint information;
a touch sensor configured to detect a movement of a finger; and
at least one processor configured to execute, when the movement of the finger from the icon toward the fingerprint sensor is detected and first fingerprint information is read by the fingerprint sensor, a function of the icon when the first fingerprint information which has been read matches registered fingerprint information which has been previously registered, wherein
the icon includes a first icon and a second icon, and the at least one processor is configured to register different types of registered fingerprint information in the first icon and the second icon, respectively.

* * * * *